July 4, 1950 M. S. SISULAK 2,513,970
SHAFT MOUNTING FOR BEARING ASSEMBLY
Filed June 20, 1947
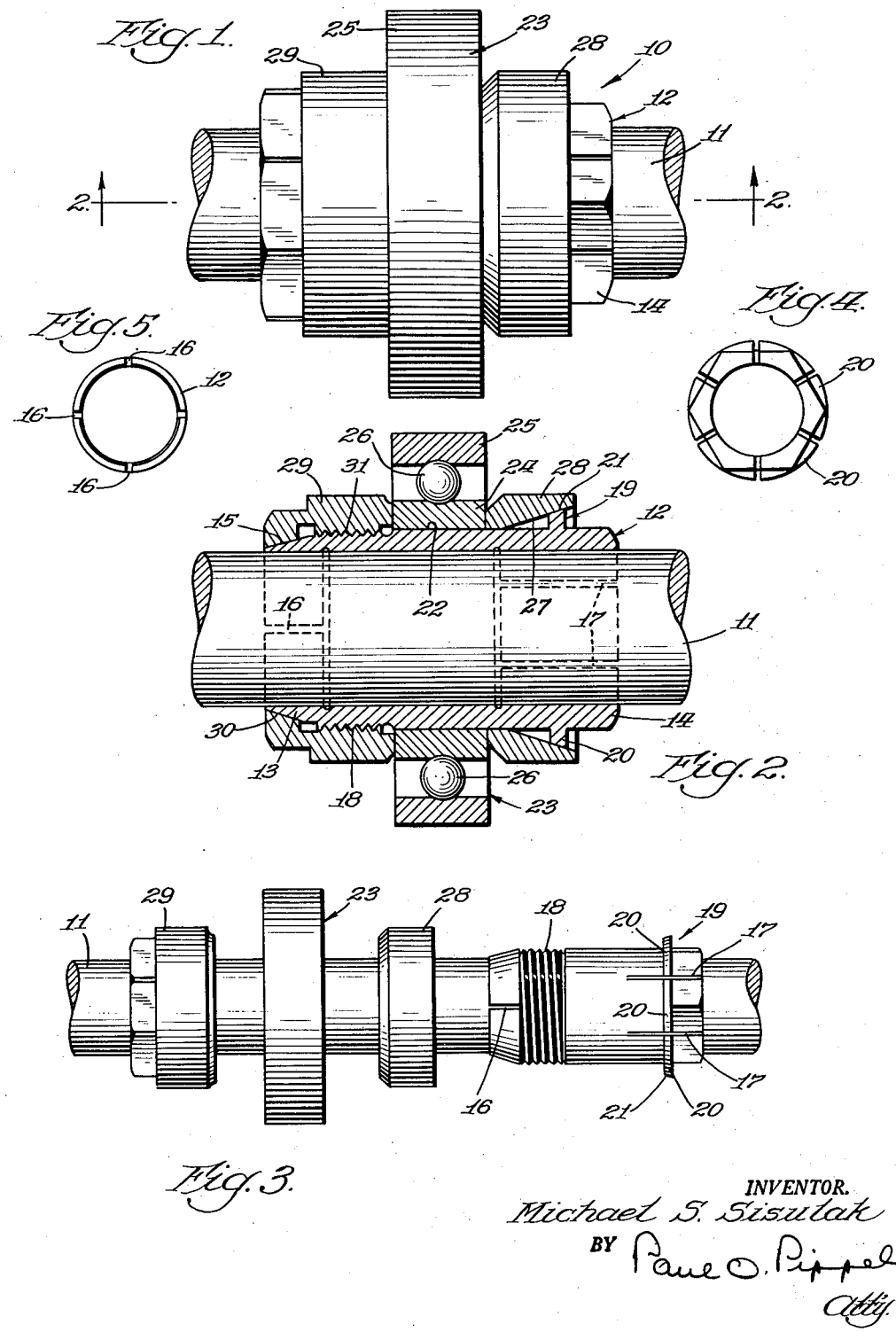
INVENTOR.
Michael S. Sisulak
BY Paul O. Pippel
Atty.

Patented July 4, 1950

2,513,970

UNITED STATES PATENT OFFICE 2,513,970

SHAFT MOUNTING FOR BEARING ASSEMBLY

Michael S. Sisulak, Chicago, Ill., assignor to International Harvester Company, a corporation of New Jersey Application June 20, 1947, Serial No. 755,824

1 Claim. (Cl. 287—52.07)

This invention relates to an antifriction bearing mounting and more specifically to a shaft mounting for a bearing.

In order to rigidly secure bearing assemblies against lateral thrust with respect to shafting, various constructions have been employed in the past. One of the most effective ways for accomplishing this result was to longitudinally slot both ends of an adapter sleeve and provide each end of said sleeve with a conical or tapering surface. Clamping elements having tapered inner surfaces would then be threaded to the outer ends of the sleeve, and by tightening these clamping members the sleeve would be forced or compressed inwardly and thereby securely clamp the bearing assembly to the shaft. This type of construction, though satisfactory, proved expensive and required the tightening of independent clamping members thereby providing a costly assembly problem. In order to eliminate the cost problem and yet provide an efficient bearing assembly whereby both ends of an adapter sleeve are securely clamped to a shaft, applicant has devised a novel construction wherein it is only necessary to tighten one clamping member.

It is the prime object of this invention to provide a simple and inexpensive shaft mounting for a bearing, said mounting including a slotted adapter sleeve which can be securely mounted on a shaft by simply tightening one clamping member.

Other objects will become more apparent as the description proceeds when read in conjunction with the accompanying drawing.

In the drawing, Figure 1 is an elevational view of the shaft mounting and bearing assembly.

Figure 2 is a sectional view of the shaft mounting and bearing assembly taken along the line 2—2 of Figure 1.

Figure 3 is an elevational view showing a shaft having the various parts of a shaft mounting assembly carried thereon in disassembled and spaced apart relation.

Figure 4 is a detail end view of one end of the adapter sleeve.

Figure 5 is a detail end view of the other end of the same adapter sleeve.

A shaft mounting and bearing assembly is generally indicated by the reference character 10. The bearing assembly, as best shown in Figures 2 and 3, is mounted on a shaft 11. The bearing assembly comprises a sleeve adapter 12 having end portions 13 and 14. The end portion 13 is provided with a downwardly and outwardly tapering surface 15 and includes a plurality of longitudinally extending slots 16. The end portion 14 of the sleeve adapter 12 is also provided with a plurality of longitudinally extending slots 17. Immediately adjacent the tapering surface 15 is a threaded extension 18.

The sleeve adapter 12 is provided at the end portion 14 with a circumferentially extending rim 19 comprising a plurality of projecting segments 20. Each of the projecting segments 20 is provided with an outer tapering surface 21, said surface sloping downwardly in the same direction as the tapering surface 15.

Positioned between the ends of the sleeve adapter 12 is a bearing supporting surface 22 on which is mounted an antifriction bearing 23. The antifriction bearing 23 includes an inner race 24 and an outer race 25 supporting a plurality of ball bearings 26. A collar 28 is positioned adjacent the antifriction bearing 23 and inwardly of the circumferentially extending rim 19. The collar 28 is provided with an inner tapering surface 27 which is adapted to engage the tapering surface 21 of the circumferentially extending rim 19.

A clamping member or nut 29 having a tapering surface 30 and an inner screw threaded surface 31 is screwed to the threaded extension 18.

During assembly of the shaft mounting the sleeve adapter 12 is slid over the shaft 11 as best shown in Figure 3. The sleeve adapter 12 may be readily moved along this shaft, since the dimensional tolerance between the sleeve and the shaft is sufficient to provide for sliding engagement. The collar 28 is then moved over the sleeve adapter 12 until the inner tapering surface 27 is in engagement with the tapering surfaces 21 of the projecting segments 20. The bearing assembly is then placed over the bearing supporting surface 22 of the sleeve adapter 12. After these parts are in place, the threaded nut 29 is screwed and tightened over the threaded extension. As the clamping member or nut 29 is tightened the inner bearing race 24 is thrust against the collar 28. In view of the tapering relation of the collar 28 and the projecting segments 20, the end 14 of the adapter sleeve 12 is resiliently compressed inwardly against the shaft 11. The same action takes place at the end portion 13 due to the tapering relationship of the clamping member 29 and the tapering surface 15. As the clamping member 29 is tightened further, both ends of the sleeve adapter are rigidly secured on the shaft 11 and the shaft mounting assembly is secured against endwise thrust. The parts of the structure are machined to sufficiently close dimensional tolerances so that the clamping pressures at both ends of the adapter sleeve are substantially the same It can be seen, therefore, that an efficient bearing mounting has been provided wherein a minimum of parts is required to securely fasten the bearing assembly to a shaft. The parts can be quickly assembled and it is only necesary that one clamping member be utilized to tighten both ends of the bearing. Thus considerable time saving can be afforded in the assembly of this construction.

It is to be understood that changes and modifications may be made in this construction which do not materially depart from the spirit of the invention as disclosed nor the scope thereof as defined in the appended claim.

What is claimed is:

A shaft mounting for a bearing comprising an adapter sleeve having first and second longitudinally slotted portions disposed at opposite ends of said sleeve, the slotted portions being movable inwardly toward a shaft for engaging the same in clamping relation, a circumferentially extending tapering surface adjacent the first slotted portion, a threaded extension adjacent the tapering surface of the first slotted portion, said extension being spaced inwardly from the tapering surface, a circumferentially extending rim adjacent the second slotted portion, said rim projecting outwardly from the adapter sleeve and having a plurality of circumferentially disposed slots in alignment with the slots of the second slotted portion, a tapering surface on said rim, said tapering surface tapering in the same general direction as the tapering surface of the first slotted portion, a bearing supporting surface on said sleeve disposed between the threaded extension and the rim, a collar adjacent the bearing supporting surface, said collar having an inner tapering surface movable to engage the tapering surface of said rim, means for moving said collar longitudinally with respect to said rim, said means including a clamping member having an inner tapering surface adapted to engage the tapering surface of said first slotted portion, screw threads on said clamping member engaging the threaded extension, said clamping member being arranged to move a bearing on the bearing surface into engagement with the collar thereby moving the collar longitudinally whereby the first and second slotted portions are simultaneously moved inwardly to grip a shaft in clamping relation.

MICHAEL S. SISULAK.

REFERENCES CITED

The following references are of record in the file of this patent:

UNITED STATES PATENTS

| Number | Name | Date |
|---|---|---|
| 1,139,120 | Hoffman | May 11, 1915 |
| 1,677,326 | Bowen | July 17, 1928 |
| 2,377,035 | Pixley | May 29, 1945 |